United States Patent
Fletcher et al.

(10) Patent No.: US 9,845,092 B2
(45) Date of Patent: Dec. 19, 2017

(54) METHOD AND SYSTEM FOR DISPLAYING PROBABILITY OF A COLLISION

(71) Applicant: Continental Automotive Systems, Inc., Auburn Hills, MI (US)

(72) Inventors: Graham Lanier Fletcher, North Augusta, SC (US); Jeremy Jason McClain, Oxford, MI (US); David Leslie Agnew, Clarkston, MI (US); Ibro Muharemovic, Shelby Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 62 days.

(21) Appl. No.: 14/644,233

(22) Filed: Mar. 11, 2015

(65) Prior Publication Data

US 2015/0258991 A1    Sep. 17, 2015

Related U.S. Application Data

(60) Provisional application No. 61/951,094, filed on Mar. 11, 2014.

(51) Int. Cl.
| | |
|---|---|
| *B60Q 1/00* | (2006.01) |
| *B60W 30/095* | (2012.01) |
| *B60Q 9/00* | (2006.01) |
| *G08G 1/16* | (2006.01) |
| *B62D 15/02* | (2006.01) |
| *B60W 50/14* | (2012.01) |

(52) U.S. Cl.
CPC .......... *B60W 30/095* (2013.01); *B60Q 9/008* (2013.01); *B62D 15/0295* (2013.01); *G08G 1/166* (2013.01); *B60W 2050/146* (2013.01); *B60W 2520/10* (2013.01); *B60W 2550/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,049,749 A | * | 4/2000 | Kobayashi | B60Q 1/122 340/469 |
| 7,966,127 B2 | * | 6/2011 | Ono | B60R 21/0134 701/300 |

(Continued)

FOREIGN PATENT DOCUMENTS

| | | |
|---|---|---|
| DE | 102004020424 A1 | 11/2005 |
| DE | 112005003266 T5 | 9/2008 |

(Continued)

OTHER PUBLICATIONS

PCT/US2015/019831 International Search Report and the Written Opinion of the International Searching Authority dated Jun. 10, 2015.

*Primary Examiner* — Travis Hunnings

(57) ABSTRACT

A maneuvering assistance system for a vehicle determines a scalar field representing the probability of collision with an object at locations proximate to the vehicle with a controller located within the vehicle. The probability of collision is determined based on information received indicative of vehicle motion and the proximity of the object to the vehicle, and the field of collision probability is then communicated as a visual representation to an operator of the vehicle.

13 Claims, 5 Drawing Sheets

(56) References Cited

U.S. PATENT DOCUMENTS

| | | | |
|---|---|---|---|
| 8,655,579 B2* | 2/2014 | Sakugawa | G08G 1/166 |
| | | | 340/435 |
| 9,035,760 B2 | 5/2015 | Reilhac et al. | |
| 2008/0097699 A1* | 4/2008 | Ono | B60R 21/0134 |
| | | | 701/300 |
| 2008/0174454 A1* | 7/2008 | Bitar | G01C 23/00 |
| | | | 340/975 |
| 2012/0330541 A1* | 12/2012 | Sakugawa | G08G 1/166 |
| | | | 701/301 |
| 2015/0344030 A1* | 12/2015 | Damerow | B60W 30/0956 |
| | | | 701/1 |

FOREIGN PATENT DOCUMENTS

| | | |
|---|---|---|
| DE | 102010052304 A1 | 5/2012 |
| DE | 102005062151 A1 | 7/2012 |
| DE | 102011083770 A1 | 4/2013 |
| EP | 1288072 A2 | 3/2003 |
| KR | 20140014822 A | 2/2014 |
| WO | 2009036176 A1 | 3/2009 |

* cited by examiner

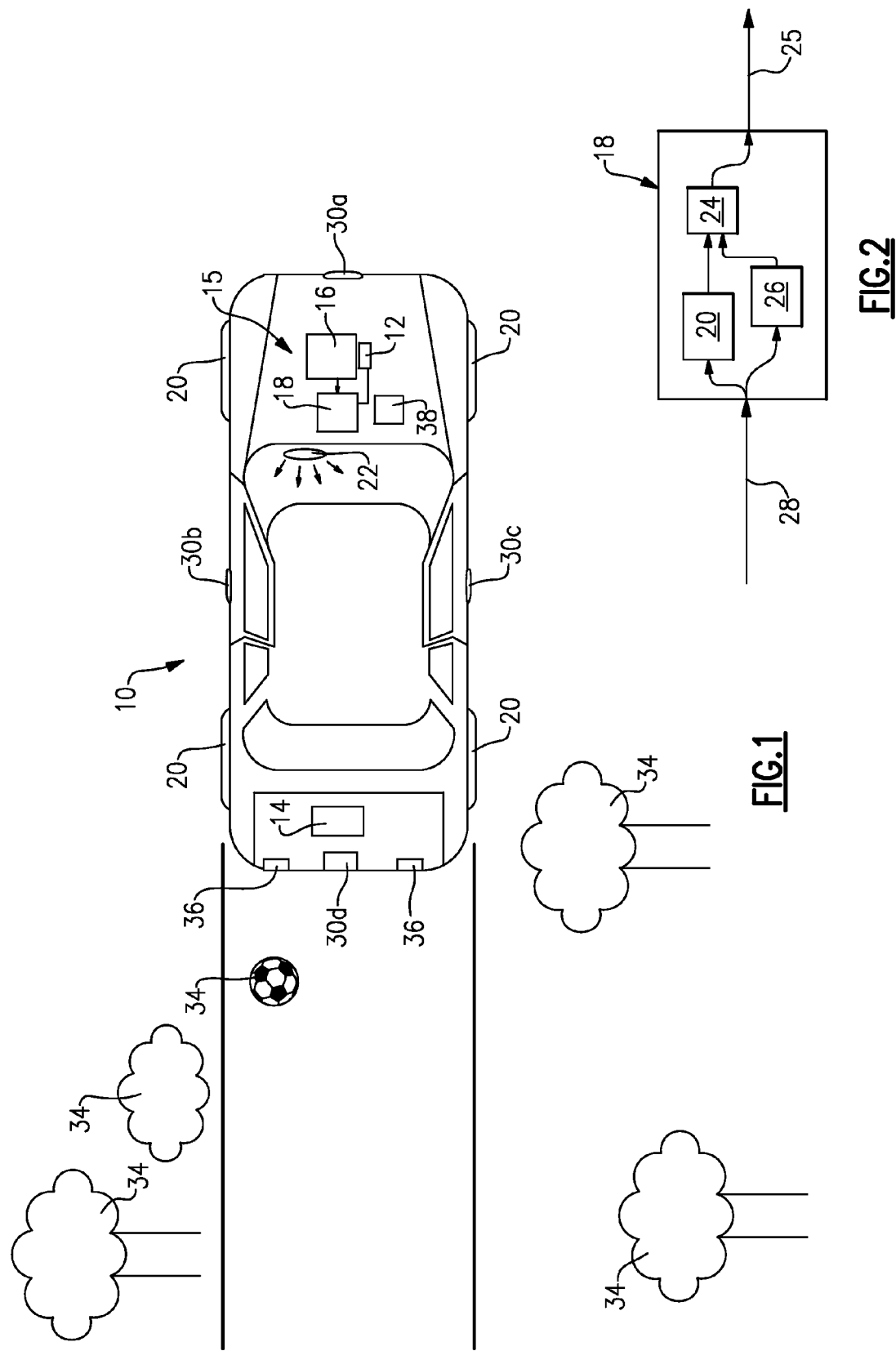

METHOD AND SYSTEM FOR DISPLAYING PROBABILITY OF A COLLISION

CROSS REFERENCE TO RELATED APPLICATION

This application claims priority to U.S. Provisional Application No. 61/951,094 filed Mar. 11, 2014.

TECHNICAL FIELD

The present disclosure relates to automotive vehicles, and more particularly to driver assistance systems for automotive vehicles.

BACKGROUND

Advancements in available sensor technology have led to the ability to improve safety systems for vehicles. Arrangements and methods for detecting and avoiding collisions are becoming available. Such driver assistance systems use sensors located on the vehicle to detect an impending collision. The systems may warn the driver of various driving situations to prevent or mitigate collisions. Additionally, sensors and cameras are used to alert the driver of possible obstacles when the vehicle is traveling in reverse. Such systems are especially useful for increasing safety in vehicles that operate under autonomous or semi-autonomous conditions.

The background description provided herein is for generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A disclosed method of assisting in the maneuvering of a vehicle includes the steps of determining a scalar field representing the probability of collision with an object at various locations proximate to the vehicle with a controller located within the vehicle. The probability of collision is determined based on information received indicative of the proximity of the object to the vehicle, and the field of collision probability is displayed with a visual representation to an operator of the vehicle.

A disclosed maneuver assistance system for a vehicle includes a controller including a first portion receiving information indicative of vehicle motion, a second portion receiving information indicative of the proximity of an object to the vehicle, and a third portion for generating a scalar field representing the probability of collision at various locations proximate to the vehicle based on the information indicative of vehicle motion and the proximity of an object to the vehicle. The controller generates a signal used by a display to generate a visual representation of the probability of collision with the object to enable communication of the probability of collision to an operator of the vehicle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The present disclosure will become more fully understood from the detailed description and the accompanying drawings, wherein:

FIG. 1 is a schematic illustration of a top view of a vehicle utilizing a disclosed maneuver assistance system;

FIG. 2 is a schematic illustration of an example controller of the maneuver assistance system;

DETAILED DESCRIPTION

Figure 3:
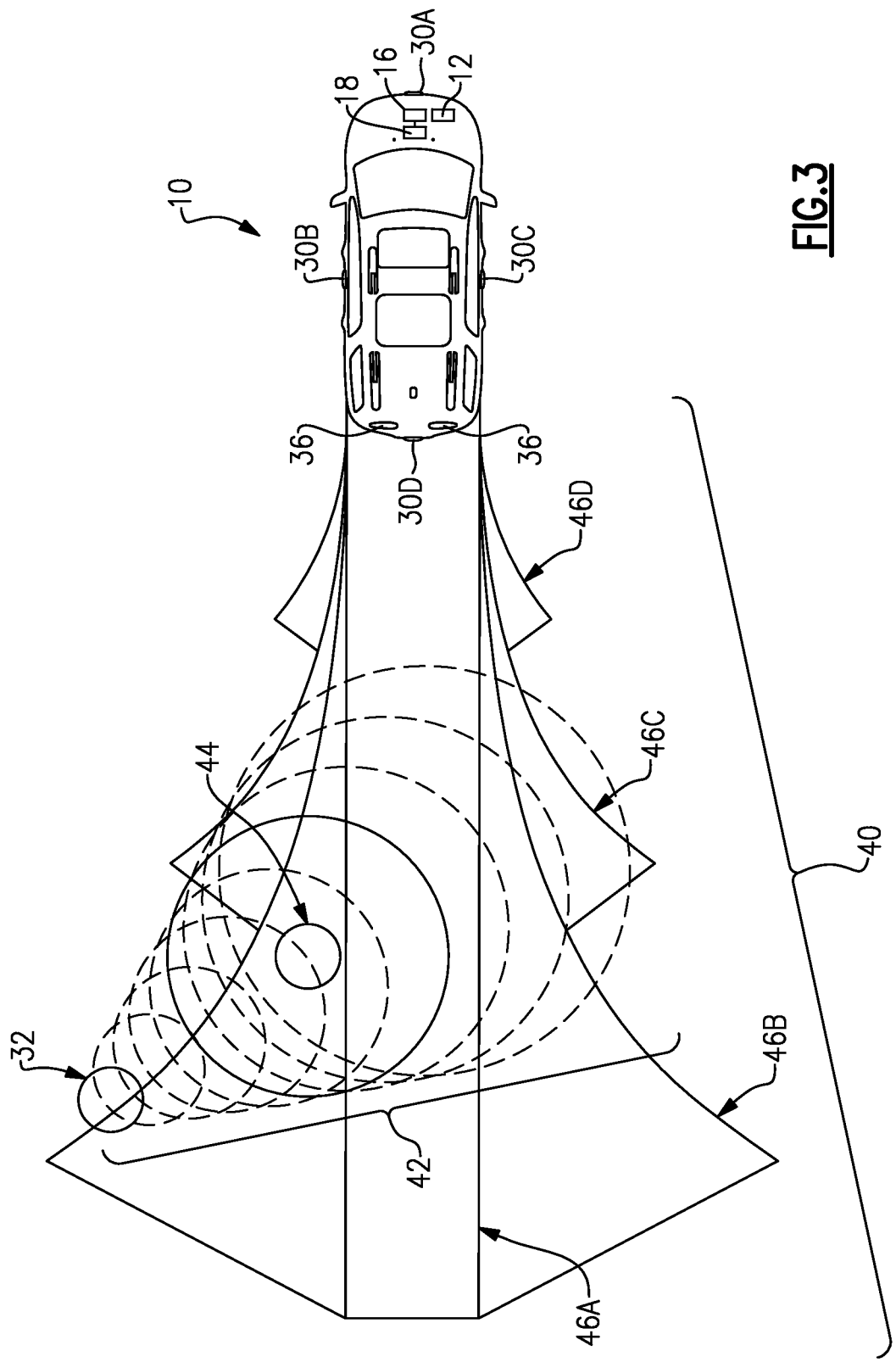
FIG. 3 is a schematic illustration of possible object and vehicle paths predicted by the example maneuver assistance system.

The following description is merely exemplary in nature and is in no way intended to limit the disclosure, its application, or uses. For purposes of clarity, the same reference numbers will be used in the drawings to identify similar elements.

Referring to FIG. 1, a vehicle 10 includes a driver assistance system 15. The driver assistance system 15 includes a controller 18 and display 22 within the vehicle cabin. The display 22 is viewable by a vehicle operator. The controller 18 receives information indicative of vehicle motion and the proximity of an object 34, and then generates a visual representation on the display 22 for communicating the probability of a collision with the object 34 at various locations behind the vehicle.

The example vehicle 10 further includes an automatic braking system 12 (schematically shown) that may be used to stop or slow the vehicle 10 during autonomous and/or semi-autonomous vehicle operations. In particular, the automatic braking system 12 may be used when the vehicle 10 is performing a reverse driving operation. Throughout this specification, the relative forward and reverse directions are in reference to the direction that an operator for the vehicle 10 would primarily be facing when operating the vehicle 10.

The driver assistance system 15 and the automatic braking system 12 may be used along with other safety systems, such as a reverse collision avoidance system 14 and an electronic brake system (EBS) 16. The controller 18 may be used for all of the systems 12, 14, 15 and 16, or each system 12, 14, 15, and 16 may have a separate controller that can communicate with each of the others. Moreover, the controller 18 may be part of an overall vehicle controller that governs all vehicle operations.

Referring to FIG. 2 with continued reference to FIG. 1, the controller 18 includes a first portion 20 for receiving information indicative of vehicle motion. The information indicative of vehicle motion is provided from an input 28 that includes signals from sensors disposed within the vehicle 10. The controller 18 includes a second portion 26 receiving information indicative of the proximity of an object to the vehicle and other characteristics of that object, such as velocity and classification. A third portion 24 of the controller 18 generates a scalar field representing the probability of collision at various locations proximate to the vehicle based on information indicative of vehicle motion and proximity of the object. The controller 18 uses the probability determination to generate an output signal 25 that directs the display 22 to generate a visual representation of the scalar field representing the probability of collision and communicate this information to the operator of the vehicle.

The probability of collision is used to determine a value such as a collision confidence number to determine the likelihood of a collision. The more likely a collision with the object 34 the higher the value of the collision confidence number. If the probability of collision exceeds a predetermined threshold, the controller 18 can communicate that at least one vehicle collision avoidance action may be required. The required action can include issuing a warning to a driver when an object is detected and/or actuating the automatic braking system 12 to slow or stop the vehicle.

The display device 22 installed within the vehicle 10 generates a visual representation of the surrounding environment for viewing by the driver. The visual representation can include a two-dimensional or three-dimensional rendering of the collision probability for locations proximate to the vehicle, given the detected position of an object 34.

The vehicle 10 includes proximity sensors 36 and cameras 30A-D that provide the input 28 to the controller 18. It should be understood that the proximity sensors 36 and the cameras 30A-D are only an example combination of sensors that could be utilized to provide information to the disclosed maneuver assistance system 15. The cameras 30A-D may be monocular cameras, binocular cameras, or another type of sensing device capable of providing a view of the future path of the vehicle 10. The cameras 30A-D are mounted to the sides, front and rear of the vehicle such that an image of the complete environment surrounding a vehicle can be obtained and generated.

In addition to the cameras 30A-D, the system 15 may use other systems and sensors to assist in identifying objects 34. Such systems and sensors may include, but are not limited to, proximity sensors 36, LiDAR, radar, ultrasonic sensors, GPS 38, radio sensors, etc. Furthermore, other sensors that can provide information indicative of vehicle operation and proximity of objects surrounding the vehicle 10 are within the contemplation of this disclosure.

Referring to FIG. 3 with continued reference to FIG. 1, the controller 18 includes an algorithm that performs a probabilistic analysis of sensor-reported objects, including stationary objects and moving pedestrians, expected and/or possible motion of detected pedestrians, and expected and/or possible driver input. The current vehicle path and potential driver input is utilized to predict a range of potential vehicle paths.

The probabilistic analysis includes generating a predictive model of possible vehicle paths 40 and a predictive model of possible object paths 42. The predicted vehicle paths 40 include the expectation that the vehicle will continue along its current path as is shown schematically by 46A, but also account for the fact that the driver may turn the vehicle 10 such that it proceeds along an alternate path such as is schematically indicated at 46B, 46C and 46D.

Similarly, the positional uncertainty of the object expands over time, as illustrated by 42. The predicted position of the object 34 at a given point in time can be a function of object characteristics such as current position and velocity. For each successive future time, the actual location of the object 34 may be in an ever-increasing range of possible locations. From the initial position of the object 32, a predictive model is generated for possible locations of the object 42 relative to possible vehicle paths 40.

The predictive model of the vehicle path 40 and the predictive model of the object path 42 are combined to identify possible intersecting points that are indicative of a collision. The joint probability of the vehicle path sample and object path sample are used to determine the probability of collision for each intersecting point. The set of all such intersecting points comprises the field of collision probability that is visualized for the driver.

Figure 4:
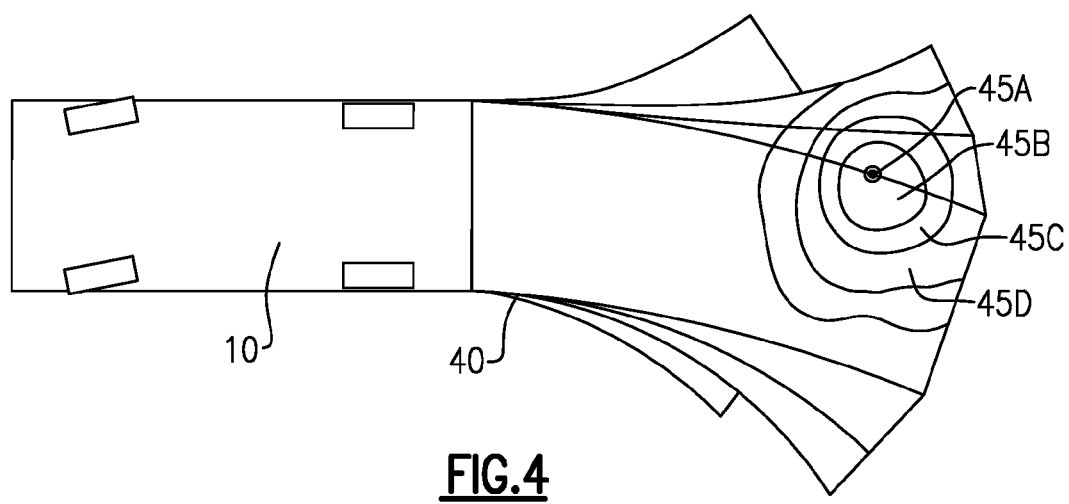
FIG. 4 is a graphical illustration of a two-dimensional image illustrating a visual depiction of a field of collision probability.

Referring to FIG. 4, the disclosed system provides for the display 22 to generate a visual representation of the determined field of collision probability as was illustrated by FIG. 3. The display 22 provides a visual indication to the driver of each location where the collision probability is non-zero or greater than a predetermined threshold value. The information is communicated by changes in color and opacity, and the visualization is updated as the vehicle moves or the environment changes. The displayed images account for the current path of the vehicle, taking into account the vehicle's current gear (forward and reverse), speed and steering angle.

In the example illustrated in FIG. 4, the probability of a collision is indicated by the variations in color attributes such as hue, saturation, luminosity or opacity, as indicated by 45A-D. The shaded area indicated at 45A is brightest and corresponds to the greatest probability of collision. The shaded area 45D is darker and indicates a lesser probability of collision. The intermediate shaded areas 45B and 45C indicate respective levels of collision probability that are displayed to the vehicle operator.

FIG. 4 is a simple two-dimensional visual representation that illustrates a predicted vehicle path 40 with the probability of collision at various locations represented by the shaded areas 45A-D. The visual representation provided to the driver can correspond with the actions taken by the collision avoidance system 14 to provide greater awareness and understanding of system interventions to the driver.

Figure 5:
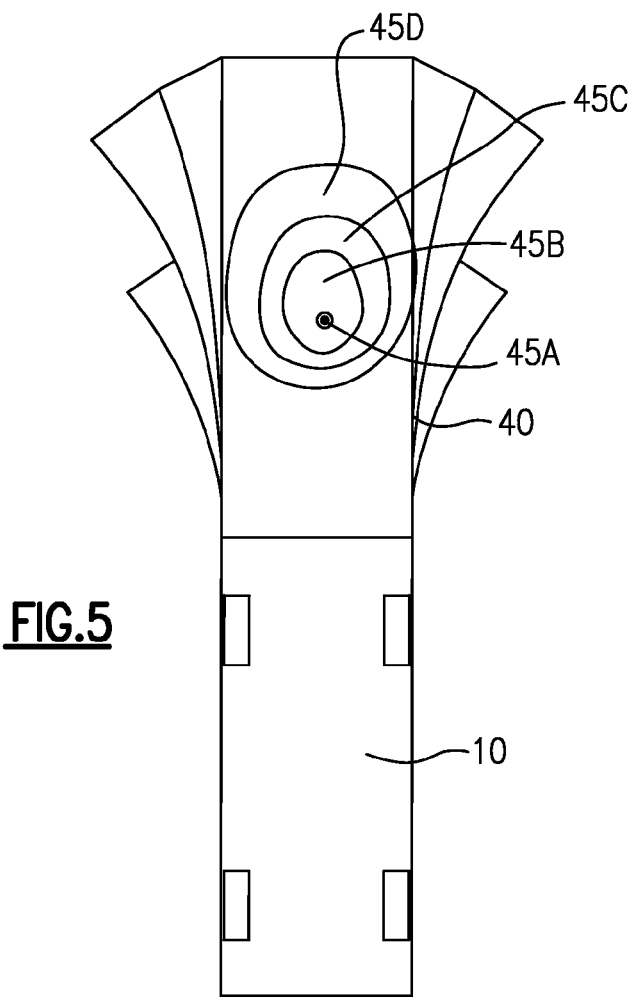
FIG. 5 is a graphical illustration of a two-dimensional image illustrating another visual depiction of a field of collision probability.
Figure 6:
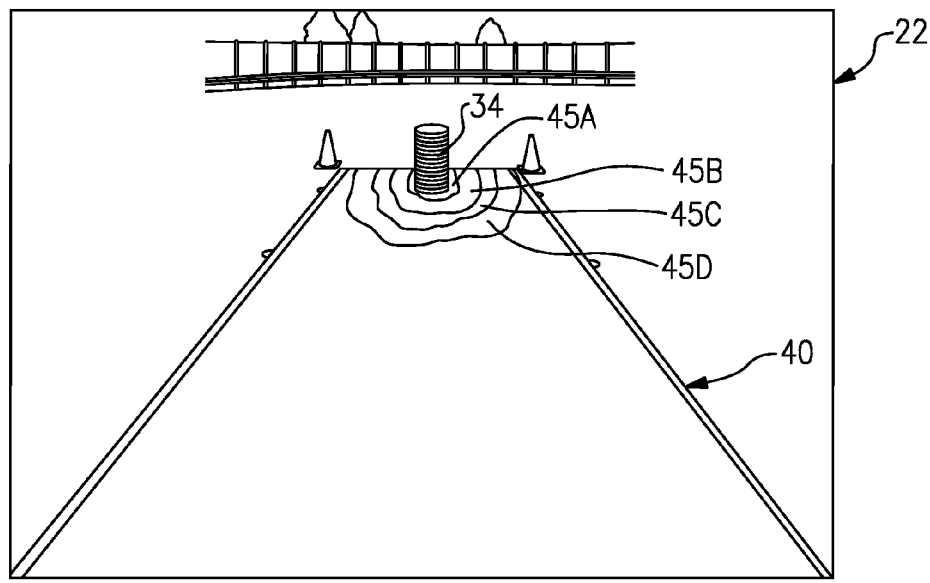
FIG. 6 is a graphical illustration of a field of collision probability overlaid on a rear-view camera image.

Referring to FIGS. 5 and 6, the vehicle 10 is shown schematically along with the predicted path 40. A detected object 34 is represented by a range of color variations that progressively become brighter as the probability of collision increases. FIG. 5 illustrates the field of collision probability relative to the predicted vehicle paths. FIG. 6 is an example view that might be generated by the display 22 that overlays the predicted path 40 and field of collision probability 45 on an image generated by one of the cameras 30D. Variations in the probability of collision are represented by the different colors or shading 45A-D. The view provided by the display 22 serves to communicate the probability information through the shading 45A-D and thereby inform the driver of potential collision risks. The lower the probability of collision, the lighter or more transparent the collision probability overlay.

As appreciated, the example disclosed in FIG. 6 is straightforward as the object 34 is stationary and within the view of the camera 30D and therefore is visible within the display. However, the example maneuver assistance system 15 could also detect objects 34 that may be outside of the camera field of view and generate a color variation in regions with non-zero collision probability to inform the driver of potential collision risks.

Figure 7:
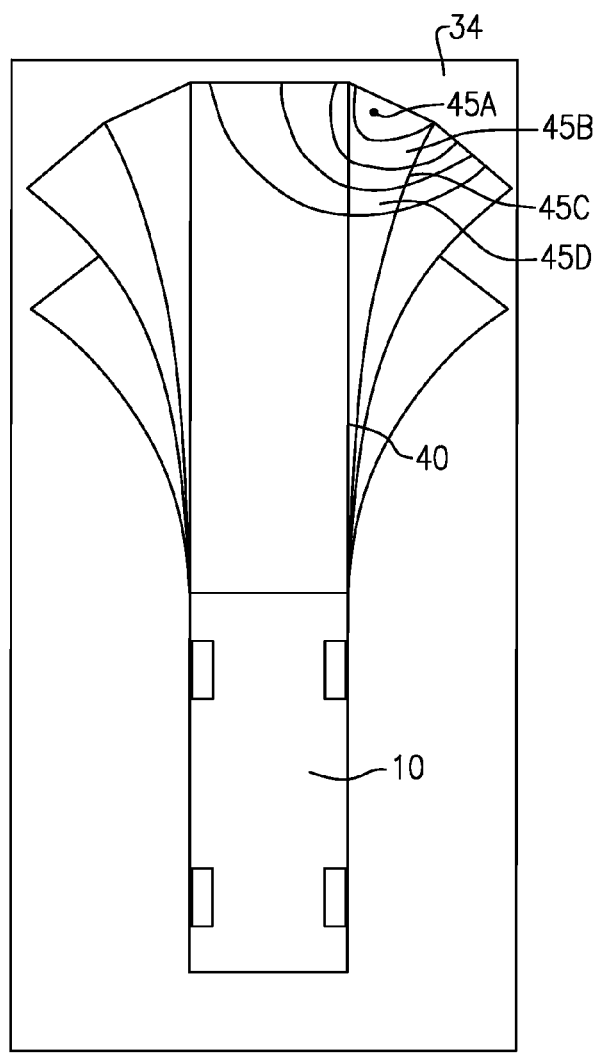
FIG. 7 is another graphical illustration of a two-dimensional image illustrating a visual depiction of a field of collision probability for an object outside of the vehicle path.
Figure 8:
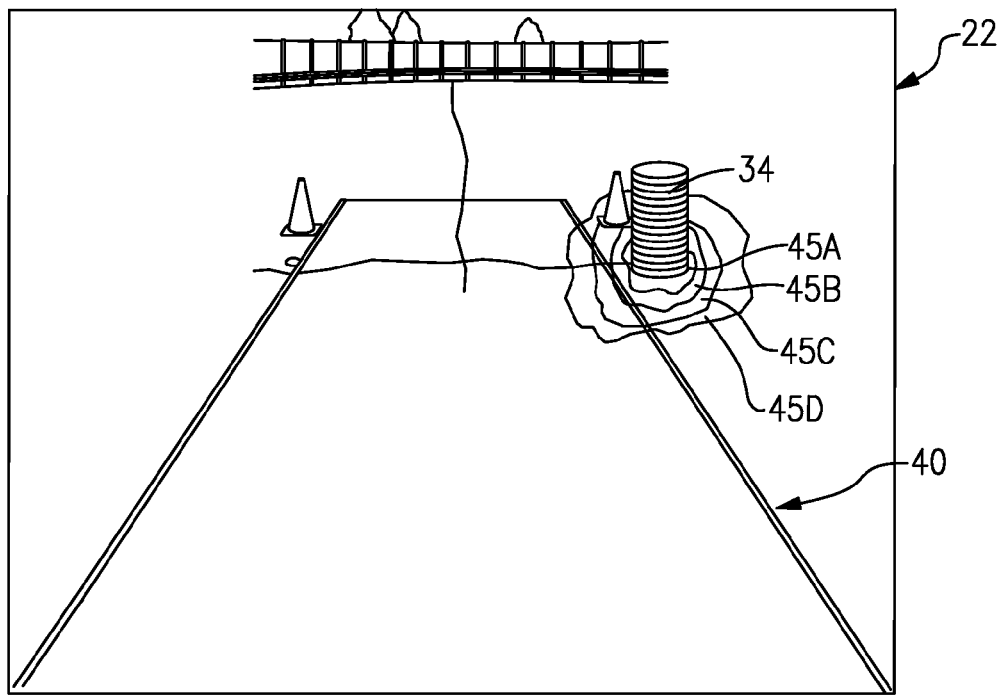
FIG. 8 is another graphical illustration of a field of collision probability overlaid on a rear-view camera image.

Referring to FIGS. 7 and 8, an object 34 is shown that is outside of the current vehicle path 46A. Since the driver could modify the current vehicle trajectory and the object could change its position, there is still a non-zero probability of collision at locations marked by the shaded areas 45A-D. The majority of the area bounded by the current vehicle path 46A is not shaded, which indicates no risk of a collision. However, the shaded regions 45A-D have a non-zero probability of collision and help to inform the vehicle operator of potential collision risks, even when that collision risk is not visibly obvious. In such a case, the operator of the vehicle could respond by modifying the vehicle's trajectory to reduce the collision risk and increase safety.

Although the examples illustrated in FIGS. 5-8 include objects that are stationary, the example system 15 can also generate a visual representation of the probability of collision for moving objects, even when the objects are not currently within the field of view of the camera 30D.

Figure 9:
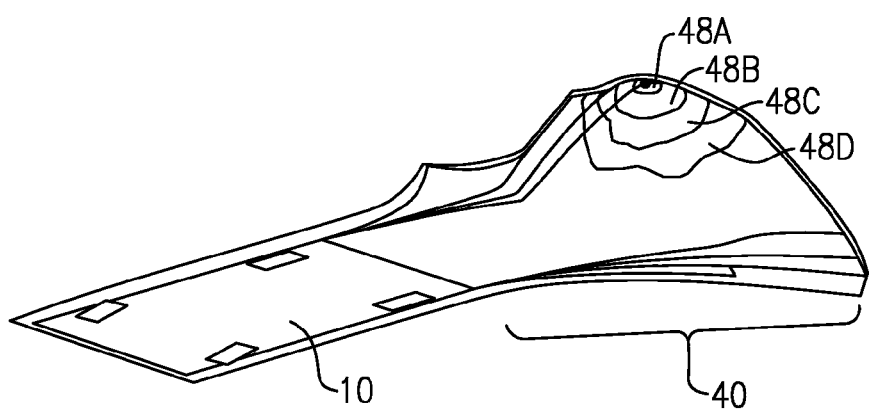
FIG. 9 is a graphical illustration of a three-dimensional image illustrating a field of collision probability for an object within the vehicle path.

FIG. 9 shows an example of how a three-dimensional (3-D) rendering could be used to depict the probability of collision. Like the shading 45A-D shown in FIGS. 5-8, the plots indicated by 48A-D show how a third dimension can be used to visually represent the probability of a collision. The 3-D representation provides a unique perspective to the driver that can be actively modified based on driver actions or changes in the environment. This active modification results in an immediate update of the collision probability rendering such that the driver can have a better and more thorough understanding of how different actions affect the risk of collision with a detected object.

It should be appreciated that many different display highlighting techniques and formulations are within the contemplation of this disclosure for communicating potential collision probability in view of a current predicted vehicle path.

Accordingly, the example system 15 utilizes predictive models of both the vehicle path 40 and a detected object path 42 to determine a probability of collision that is visually represented on the display 22 that enables the driver to take preventative measures to avoid collisions.

While the best modes for carrying out the disclosed system have been described in detail, the true scope of the disclosure should not be so limited, since those familiar with the art to which this invention relates will recognize various alternative designs and embodiments for practicing the invention within the scope of the appended claims.

What is claimed is:

1. A method of assisting in maneuvering of a vehicle, the method comprising:
   receiving, at a controller located within the vehicle, signals indicative of vehicle motion associated with the vehicle;
   generating, using the controller, a predictive model of possible vehicle paths based on the received signals;
   receiving, at the controller, information indicative of the proximity of one or more objects to the vehicle;
   generating, using the controller, a predictive model of possible object paths for each one of the one or more objects based on the received information associated with each object;
   determining, using the controller, possible intersecting points indicative of a collision based on the predictive model of possible vehicle paths and the predictive model of possible object paths;
   determining, using the controller, for each object of the one or more objects, a scalar field representing a probability of collision for each possible intersecting point with the object at various locations proximate to the vehicle, the probability of collision is determined based on the received signals indicative of the vehicle motion and the received information indicative of the proximity of the object to the vehicle; and
   visually displaying, on a display mounted within the vehicle and configured to communicate with an operator of the vehicle, a visual representation including the possible vehicle paths, the possible object paths, the possible intersecting points between the vehicle paths and object paths, and the probability of collision between each one of the one or more objects and the vehicle associated with each one of the intersecting points.

2. The method as recited in claim 1, including detecting an object proximate to a vehicle with at least one sensor mounted to the vehicle and generating a signal indicative of the position of the object relative to the vehicle.

3. The method as recited in claim 1, further comprising:
   recalculating the scalar field representing the probability of collision responsive to one of movement of the vehicle and movement of the object; and
   modifying the visual representation to reflect the recalculated scalar field representing the probability of collision with the object.

4. The method as recited in claim 1, wherein the generated visual representation includes a color variation that is indicative of the probability of collision between the vehicle and the object.

5. The method as recited in claim 1, wherein the generated visual representation includes a pattern variation that is indicative of the probability of collision between the vehicle and the object.

6. The method as recited in claim 1, wherein generating the visual representation includes rendering a three-dimensional plot to represent the probabilities of collision between the vehicle and the object at various locations on the ground plane.

7. A maneuver assistance system for a vehicle comprising:
   a controller including:
      a first portion receiving information indicative of vehicle motion;
      a second portion receiving information indicative of a proximity of one or more objects to the vehicle, wherein the controller generates a predictive model of possible vehicle paths based on the information indicative of vehicle motion and a predictive model of possible object paths based on the received information indicative of the proximity of the one or more objects to the vehicle and determines possible intersecting points indicative of a collision based on the predictive model of possible vehicle paths and the predictive model of possible object paths; and
      a third portion for generating, for each object of the one or more objects, a scalar field representing a probability of collision between an object at various locations proximate to the vehicle, the probability of collision is determined based on the received signals indicative of the vehicle motion and the received information indicative of the proximity of the object to the vehicle; and a display mounted within the vehicle and configured to communicate with an operator of the vehicle, the display visually displaying a visual representation including the possible vehicle paths, the possible object paths the possible intersecting points between the vehicle paths and object paths, and the probability of collision between each one of the one or more objects and the vehicle associated with each one of the intersecting points.

8. The maneuver assistance system as recited in claim 7, further comprising at least one sensor mounted to the vehicle for communicating information indicative of vehicle motion and proximity of an object to the controller.

9. The maneuver assistance system as recited in claim 7, further comprising at least one camera mounted to the vehicle for generating an image of an environment surrounding the vehicle.

10. The maneuver assistance system as recited in claim 7, wherein the controller includes instructions for generating an image of the surrounding environment of the vehicle and generating the visual representation for display to the vehicle operator.

11. The maneuver assistance system as recited in claim 7, wherein the visual representation generated by the display includes a color variation that is indicative of the probability of collision between the vehicle and the object.

12. The maneuver assistance system as recited in claim 7, wherein the visual representation generated by the display includes a pattern variation that is indicative of the probability of collision between the vehicle and the object.

13. The maneuver assistance system as recited in claim 7, wherein the visual representation generated by the display includes a three-dimensional plot to represent the probabilities of collision between the vehicle and the object at various locations on the ground plane.

* * * * *